United States Patent
Hayashi et al.

(10) Patent No.: US 12,495,819 B2
(45) Date of Patent: Dec. 16, 2025

(54) METHOD FOR PRODUCING DRIED FRUIT POWDER

(71) Applicant: NIKKEN FOODS CO., LTD., Fukuroi (JP)

(72) Inventors: Yoshichika Hayashi, Fukuroi (JP); Kai Sugiyama, Fukuroi (JP); Siddhartha Shankar Das, Fukuroi (JP)

(73) Assignee: NIKKEN FOODS CO., LTD., Fukuroi (JP)

( * ) Notice: Subject to any disclaimer, the term of this patent is extended or adjusted under 35 U.S.C. 154(b) by 472 days.

(21) Appl. No.: 17/767,948

(22) PCT Filed: Feb. 14, 2020

(86) PCT No.: PCT/JP2020/005721
§ 371 (c)(1),
(2) Date: Apr. 11, 2022

(87) PCT Pub. No.: WO2021/070402
PCT Pub. Date: Apr. 15, 2021

(65) Prior Publication Data
US 2024/0090544 A1    Mar. 21, 2024

(30) Foreign Application Priority Data
Oct. 10, 2019   (JP) ................................ 2019-186858

(51) Int. Cl.
*A23L 19/00*   (2016.01)
*A23B 7/026*   (2006.01)

(52) U.S. Cl.
CPC .............. *A23L 19/01* (2016.08); *A23B 7/026* (2013.01)

(58) Field of Classification Search
CPC .......... A23B 7/026; A23B 7/024; A23L 19/01
USPC ....................................................... 426/464
See application file for complete search history.

(56) References Cited

U.S. PATENT DOCUMENTS

2013/0122146 A1    5/2013   Ghaedian et al.

FOREIGN PATENT DOCUMENTS

| CN | 104351888 B | 6/2016 |
| GB | 1106487 A | 3/1968 |
| JP | H05252864 A | 10/1993 |
| JP | H07298849 A | 11/1995 |
| JP | 2007014208 A | 1/2007 |
| JP | 2008295440 A | 12/2008 |
| JP | 2016073321 A | 5/2016 |
| WO | 2013118726 A1 | 8/2013 |

OTHER PUBLICATIONS

Office Action (Communication) issued on Oct. 6, 2023, by the European Patent Office in corresponding European Patent Application No. 20874358.3. (8 pages).
International Search Report (PCT/ISA/210) with English translation and Written Opinion (PCT/ISA/237) mailed on May 12, 2020, by the Japanese Patent Office as the International Searching Authority for International Application No. PCT/JP2020/005721.

*Primary Examiner* — Subbalakshmi Prakash
(74) *Attorney, Agent, or Firm* — Buchanan Ingersoll & Rooney PC

(57) ABSTRACT

A novel method for producing a powder of a dried fruit is proposed. A method for producing a dried fruit powder includes: a water absorption step of causing a dried fruit to absorb water; a pulverization step of pulverizing the dried fruit after the water absorption step to form a paste in which the dried fruit after the water absorption step is pulverized so as to have a predetermined size; and a step of drying and powderizing the paste after the pulverization step.

18 Claims, No Drawings

METHOD FOR PRODUCING DRIED FRUIT POWDER

TECHNICAL FIELD

The present invention relates to a method for producing a powder of a dried food, that is, a dried food, particularly to a method for producing a powder of a dried fruit.

BACKGROUND ART

Conventionally, various proposals have been made on a method for producing a powder of a dried food.

For example, Patent Literature 1 describes a method for producing a plant powder by pulverizing a whole plant fruit including a peel and a seed at normal temperature (0° C. to 30° C.) without freezing the whole plant fruit, and spray-drying the pulverized plant product thus obtained with a nozzle type spray dryer.

Patent Literature 2 describes a method for producing a banana product, the method including: a step of providing at least one banana with a banana peel and a banana pulp; a step of heat-treating the at least one banana with a peel at a temperature sufficient to gelatinize starch present in the at least one banana with a peel for a sufficient time to form at least one heat-treated banana with a peel; a step of pulverizing the at least one heat-treated banana with a peel to form a banana puree; and a step of drying the banana puree to produce a dried banana powder.

Patent Literature 3 describes a method for producing a dried vegetable powder, the method including: a step of drying a raw vegetable by a method other than vacuum freeze drying and a vacuum freeze-drying step in this order, and also including a step of pulverizing the vegetable between the step of drying a raw vegetable by a method other than vacuum freeze-drying and the vacuum freeze-drying step or after the vacuum freeze-drying step.

CITATION LIST

Patent Literature

Patent Literature 1: JP 2008-295440 A
Patent Literature 2: JP 2016-73321 A
Patent Literature 3: WO 2013/118726 A1

SUMMARY OF INVENTION

Technical Problem

A pulverization method is usually used for obtaining a powder of a dried food, that is, a dried food such as a dried fruit or a dried vegetable.

However, it is not easy to obtain powderized dried fruit, dried vegetable, and the like by pulverizing with pulverizer. That is, when a dried fruit, a dried vegetable, and the like are to be pulverized and powderized by a pulverizer, any adhesion to the inside of the pulverizer or the like occurs. So that, it is not easy to obtain powderized dried fruit, dried vegetable, and the like by pulverizing with pulverizer. This is considered to be because a dried food such as a dried fruit or a dried vegetable contains a large amount of sugar, fiber, and the like as components, the sugar is dissolved due to heat generated at the time of pulverization, and stickiness occurs as a whole to make pulverization and powderization difficult. For this reason, when a dried fruit, a dried vegetable, and the like are to be pulverized and powderized by a pulverizer, adhesion to the inside of the pulverizer and stickiness may occur.

In particular, when a dried fruit which is generally in a form of a candied fruit is to be pulverized and powderized by a pulverizer, the above-described phenomenon significantly occurs. For this reason, a dried fruit powder processed product is not widely available on the market.

Therefore, the objective of the present invention is to propose a novel method for producing a powder of a dried food, particularly a powder of dried fruit.

Solution to Problem

A method for producing a dried fruit powder includes: a water absorption step of causing a dried fruit to absorb water; a pulverization step of pulverizing the dried fruit after the water absorption step to form a paste in which the dried fruit after the water absorption step is pulverized so as to have a predetermined size; and a step of drying and powderizing the paste after the pulverization step.

By causing a dried fruit to absorb water, the dried fruit is returned to an original state and softened, which makes it possible to pulverize the dried fruit so as to have a predetermined size. Then, a paste in which the dried fruit that has absorbed water is pulverized so as to have a predetermined size is formed, and the paste is dried and powderized to make it possible to produce a dried fruit powder (powder of dried fruit).

Advantageous Effects of Invention

According to the present invention, a novel method for producing a powder of a dried fruit can be provided. According to the production method of the present invention, a dried fruit powder can be suitably produced. A dried fruit which is generally in a form of a candied fruit contains sugar, dietary fiber, and the like as composition, and thus it is difficult to pulverize and powderize the dried fruit by a pulverizer. However, according to the present invention, a dried fruit powder can be suitably produced.

DESCRIPTION OF EMBODIMENTS

Water Absorption Step

A dried fruit is caused to absorb water. In this water absorption step, a dried fruit can be caused to absorb water by mixing a liquid at a mass ratio of 1 to 20 times the dry mass of the dried fruit.

In the above, a method for drying a fruit in order to obtain a dried fruit is not particularly limited, and a dried fruit dried by various drying methods known in this technical field, such as natural drying and hot air drying, can be used.

In the above, any edible fruit can be used as a dried fruit as a starting material. In addition, when the fruit includes a peel or a seed, a dried fruit can be obtained by drying the fruit including the peel or the seed. A product obtained by drying a whole fruit including a peel or a seed is used as a dried fruit.

Note that when the fruit includes a navel, the navel is a portion that is not consumed normally and acts as a foreign substance, and thus the navel is desirable to be removed.

The dried fruit preferably has a moisture content of 20% or less when initiating the water absorption step.

If the moisture content of the dried fruit is more than 20% when the water absorption step is initiated, it is undesirable from a viewpoint of storage stability (growth of microorganisms).

In the above, the liquid is used for the purpose of causing the dried fruit to absorb water by mixing the dried fruit and the liquid in a form of immersing the dried fruit in the liquid or the like, and thereby causing the dried fruit to return to an original state to soften the dried fruit such that the dried fruit can be pulverized so as to have a predetermined size.

Therefore, as long as this is possible, simple water (for example, drinking water), an aqueous solution (for example, a sugar solution) in which any edible component such as sugar or a starch hydrolysate (maltodextrin or the like) is dissolved, a fruit juice, or the like can be used as the liquid.

When a fruit juice is used, a combination of a dried fruit and a fruit juice made of the same fruit can be used. For example, a mango juice is used as the fruit juice when the dried fruit is dried mango, or a pineapple juice is used as the fruit juice when the dried fruit is dried pineapple. In addition, a combination of a dried fruit and a fruit juice made of different fruits can be used. For example, an orange juice is used as the fruit juice when the dried fruit is dried pineapple.

In the above, a dried fruit is caused to absorb water by mixing a liquid at a mass ratio of 1 to 20 times the dry mass of the dried fruit. If the mass ratio of the liquid is less than one time, stickiness or adhesion to a pulverizer occurs due to dissolution of sugar by heat at the time of pulverization or the like, so that it is not preferable. In addition, if the mass ratio of the liquid exceeds 20 times, the ratio of the dried fruit to the liquid decreases, significant separation occurs, or efficiency is significantly reduced in a processing step after the pulverization, so that it is not preferable.

Here, in the water absorption step of mixing the liquid at a mass ratio of 1 to 20 times the dry mass of the dried fruit and causing the dried fruit to absorb water, the dried fruit and the liquid having a predetermined water temperature can be blended and the water absorption step can be performed for a predetermined time.

The dried fruit is once returned to an original state using a liquid having a predetermined water temperature, that is, a lukewarm liquid, and then subjected to the pulverization step.

A fruit generally undergoes alteration in physical properties such as hardening, softening or alteration in components if heated. As a result, a flavor, texture, and the like are changed, and in some cases, an unpreferable quality may be obtained.

In the present invention, in producing a dried fruit powder, a dried fruit is directly powderized, that is, the powder is produced without causing significant degradation.

Therefore, the predetermined water temperature can be in a temperature range of 0° C. to 50° C.

If the water temperature exceeds 50° C., degradation may occur in a fruit used as a raw material, which is not preferable. In addition, since the water absorption step is performed for the purpose of softening the dried fruit, it is not desirable to perform the water absorption step with a liquid in a temperature range of lower than 0° C.

For the purpose of softening the dried fruit by causing the dried fruit to absorb water, it is preferable to use a liquid having a temperature as high as possible in a temperature range of 50° or lower. However, depending on the composition of the dried fruit, it may be desirable not to use a liquid having a very high temperature from a viewpoint of preventing degradation.

From such a viewpoint, the water temperature of the liquid used in the water absorption step is preferably in a temperature range of 0° C. to 50° C., more preferably in a temperature range of 3° C. to 45° C., and still more preferably in a temperature range of 15° C. to 40° C.

In any case, the water absorption step performed for a predetermined time by mixing the dried fruit and the liquid having a predetermined water temperature is performed under room temperature (20° C. to 25° C.) and atmospheric pressure (1 atm) for 10 minutes to one hour.

If the time is less than 10 minutes, the dried fruit does not sufficiently absorb moisture and causes adhesion and the like at the time of pulverization, which is not preferable. Even if the time exceeds one hour, the dried fruit reaches a state in which the dried fruit cannot absorb water any more, and there is no difference in an effect of water absorption.

As an embodiment of such a water absorption step, for example, the dried fruit and the liquid having a predetermined water temperature can be mixed at the above-described mixing ratio, and leaving the mixture to stand under room temperature (20° C. to 25° C.) and atmospheric pressure (1 atm) for 10 minutes to one hour can be performed. In this case, stirring may be appropriately performed during the mixing step.

Note that the water temperature of the liquid is desirably maintained at the water temperature at the initiation of the water absorption step while the dried fruit and the liquid having a predetermined water temperature are mixed and the water absorption step is performed for a predetermined time from a viewpoint of nixing the dried fruit and the liquid at the above-described predetermined ratio, returning the dried fruit to an original state, and subsequently pulverizing the dried fruit. Even when the treatment of maintaining the water temperature at the water temperature at the initiation of the water absorption step is not actively performed, the water temperature is desirably maintained in the above-described temperature range of 0° C. to 50° C. during the water absorption step by performing the water absorption step at room temperature (20° C. to 25° C.) and atmospheric pressure (1 atm).

Pulverization Step

After the water absorption step, a pulverization step is performed to pulverize the dried fruit to form a paste with a predetermined size.

In the pulverization step, the predetermined size at which the dried fruit after the water absorption step is pulverized in the paste can be set to 1 mm or less.

If the size after the pulverization exceeds 1 mm, the dried fruit powder, formed by drying the paste, has a roughness feeling, which is not preferable.

In addition, as described later, when spray drying is used for drying and powderization, if the size after the pulverization exceeds 1 mm, the particles are too large and it is difficult to powderize the particles, which is not preferable.

In the pulverization step, a pulverization step by a coarse pulverizer and a subsequent fine pulverization step by a fine pulverizer can be performed.

For example, the dried fruit that has absorbed water can be coarsely pulverized so as to have a size of 1 to 5 mm using a colloid mill (trade name: PUC colloid mill, manufactured by Mountech Co., Ltd.) as a coarse pulverizer, subsequently, the dried fruit that has been coarsely pulverized so as to have a size of 1 to 5 mm can be finely pulverized so as to have a size of 1 mm or less by adjusting conditions such as an gap between blades of the before described colloid mill used as the coarse pulverizer to be a fine pulverizer, and using it as the fine pulverize thereby the above-described dried fruit having a size of 1 to 5 mm can be finely pulverized having a size of 1 mm or less.

In addition to these, the predetermined size at which the dried fruit that has absorbed water is pulverized in the paste can be set to 1 mm or less using various apparatuses and machines known in this technical field. If necessary, the dried fruit that has absorbed water can also be circulated in the pulverizer until it has a size of 1 mm or less.

Drying Step

The paste after the pulverization step is subsequently dried and powderized to produce a dried fruit powder.

Note that after the above-described pulverization step, the prepared paste can be stored at room temperature, in a cooled state, or in a frozen state, and then dried and powderized.

The drying and powderizing step can be performed using various apparatuses and methods such as reduced pressure drying and spray drying as long as the above-described paste can be dried and powderized.

As conventionally performed, the reduced pressure drying includes a drying step and a subsequent pulverization step. In the drying step, moisture is removed from the paste to form a solid lump, and in the subsequent pulverization step, the solid lump from which moisture has been removed is powderized to form a dried fruit powder. The reduced pressure drying including the drying step and the subsequent pulverization step can be performed using a conventionally known reduced pressure dryer that performs both steps.

Note that when an excipient such as maltodextrin is added to the paste during the reduced pressure drying, the paste can be powderized while occurrence of adhesion and stickiness in the pulverization step in the reduced pressure drying is suppressed, which is advantageous.

According to study of the present inventor, even when an excipient such as maltodextrin was added to a normal dried fruit and was to pulverized and powderized by a pulverizer, it was difficult to powderize the dried fruit due to adhesion and stickiness to the inside of the pulverizer.

However, when the dried fruit was caused to absorb water and pulverized so as to have a predetermined size to form a paste, then an excipient was added to the paste, and the paste was dried and powderized by reduced pressure drying including a drying step and a pulverization step, adhesion or stickiness did not occur, and the paste was effectively powderized.

When the drying and powderizing step is performed by spray drying (spray drying using a spray dryer), a disk type or nozzle type spray dryer can be used.

When the drying and powderizing step is performed by spray drying, the drying and powderizing step can be performed under drying temperature conditions of an inlet temperature of 100 to 250° C. and an outlet temperature of 70 to 150° C. Under a temperature condition lower than this temperature condition, drying and powderization itself is difficult. For example, moisture evaporation is not sufficient, and adhesion to the inside of a spray dryer or the like is caused, which is not preferable. Meanwhile, under a temperature condition higher than this temperature condition, a flavor is deteriorated, and drying and powderization itself is difficult, which is not preferable. For example, adhesion of sugar or the like by heat melting due to high temperature may occur. From such a viewpoint, more preferable temperature conditions in spray drying are an inlet temperature of 100 to 250° C. and an outlet air temperature of 70 to 90° C.

Note that when spray drying is performed, water may be further added the paste prepared as described above, and then the paste may be spray-dried. For example, when the paste has a very high sugar content or a high viscosity, it is advantageous to further add water to the paste and then spray-dry the paste.

Also during drying and powderization by the spray drying, drying and powderization can be performed by adding an excipient such as maltodextrin.

Hereinafter, Examples of the present invention will be described. However, the present invention is not limited to the above-described embodiment and the following Examples, and can be modified variously within a technical range understood from description of claims.

Example 1

1000 g of water having a water temperature of 20° C. was added to 1000 g of dried raisin (moisture content: 16%), and the raisin was left to stand at room temperature and atmospheric pressure (1 atm) for one hour without maintaining the water temperature. Note that stirring was performed every 20 minutes while the raisin was left to stand.

The water-added dried raisin prepared as described above was pulverized so as to have a size of 1 to 5 mm with a colloid mill (trade name: PUC colloid mill, manufactured by Mountech Co., Ltd.).

Subsequently, conditions such as an gap between blades of the colloid mill were adjusted such that the colloid mill could finely pulverize the raisin so as to have a size of 1 mm or less, and the above prepared raisin having a size of 1 to 5 mm was pulverized so as to have a size of 1 mm or less using this colloid mill.

To the paste thus obtained, 1000 g of maltodextrin (trade name: Sandec #100C, manufactured by Sanwa Starch Co., Ltd.) as an excipient was added, and water was added thereafter, to adjust the total solid concentration to 25%.

The resulting product was spray-dried using a disc type spray dryer under drying temperature conditions of an inlet temperature of 130° C. and an outlet temperature of 90° C. to obtain 1880 g of dried raisin powder.

Example 2

2000 g of water having a water temperature of 30° C. was added to 1000 g of dried mango (moisture content: 15%), and the mango was left to stand at room temperature and normal pressure (atmospheric pressure: 1 atm) for one hour without maintaining the water temperature. Note that stirring was performed every 20 minutes while the mango was left to stand.

The water-added dried mango prepared as described above was pulverized so as to have a size of 1 to 5 mm with a colloid mill (trade name: PUC colloid mill, manufactured by Mountech Co., Ltd.).

Subsequently, conditions such as an gap between blades of the colloid mill were adjusted such that the colloid mill could finely pulverize the mango so as to have a size of 1 mm or less, and the above prepared mango having a size of 1 to 5 mm was pulverized so as to have a size of 1 mm or less using this colloid mill.

To the paste thus obtained, 1000 g of maltodextrin (trade name: Sandec #100C, manufactured by Sanwa Starch Co., Ltd.) as an excipient was added, and water was added thereafter to adjust the total solid concentration to 25%.

The resulting product was spray-dried using a disc type spray dryer under drying temperature conditions of an inlet temperature of 120° C. and an outlet temperature of 90° C. to obtain 1700 g of dried mango powder.

Example 3

2000 g of water having a water temperature of 30° C. was added to 1000 g of candied dried mango (sugar ratio: 25%)

(moisture content: 15%), and the mango was left to stand at room temperature and atmospheric pressure (1 atm) for one hour without maintaining the water temperature. Note that stirring was performed every 20 minutes while the mango was left to stand.

The water-added dried mango prepared as described above was pulverized so as to have a size of 1 to 5 mm with a colloid mill (trade name: PUC colloid mill, manufactured by Mountech Co., Ltd.).

Subsequently, conditions such as an gap between blades of the colloid mill were adjusted such that the colloid mill could finely pulverize the mango so as to have a size of 1 mm or less, and the above prepared mango having a size of 1 to 5 mm was pulverized so as to have a size of 1 mm or less using this colloid mill.

To the paste thus obtained, 1000 g of maltodextrin (trade name: Sandec #100C, manufactured by Sanwa Starch Co., Ltd.) as an excipient was added, and water was added thereafter to adjust the total solid concentration to 25%.

The resulting product was spray-dried using a disc type spray dryer under drying temperature conditions of an inlet temperature of 130° C. and an outlet temperature of 90° C. to obtain 1640 g of dried mango powder.

Example 4

4000 g of water having a water temperature of 40° C. was added to 1000 g of dried pineapple (moisture content: 12%), and the pineapple was left to stand at room temperature and atmospheric pressure (1 atm) for one hour without maintaining the water temperature. Note that stirring was performed every 20 minutes while the pineapple was left to stand.

The water-added dried pineapple prepared as described above was pulverized so as to have a size of 1 to 5 mm with a colloid mill (trade name: PUC colloid mill, manufactured by Mountech Co., Ltd.).

Subsequently, conditions such as an gap between blades of the colloid mill were adjusted such that the colloid mill could finely pulverize the pineapple so as to have a size of 1 mm or less, and the above prepared pineapple having a size of 1 to 5 mm was pulverized so as to have a size of 1 mm or less using this colloid mill.

To the paste thus obtained, 1000 g of maltodextrin (trade name: Sandec #100C, manufactured by Sanwa Starch Co., Ltd.) as an excipient was added, and water was added thereafter, to adjust the total solid concentration to 25%.

The resulting product was spray-dried using a disc type spray dryer under drying temperature conditions of an inlet temperature of 130° C. and an outlet temperature of 90° C. to obtain 1700 g of dried pineapple powder.

The invention claimed is:

1. A method for producing a dried fruit powder, the method comprising of:
    a water absorption step of causing a dried fruit having a moisture content of 20% or less to absorb water by mixing a water at a mass ratio of 1 to 20 times a dry mass of the dried fruit for more than 10 minutes;
    a pulverization step of pulverizing the dried fruit after the water absorption step to form a paste in which the dried fruit after the water absorption step is pulverized so as to have a predetermined size of 1 mm or less; and
    a step of drying and powderizing the paste after the pulverization step;
    wherein
    the water is in a temperature range of 0° C. to 50° C., and is one of drinking water, an aqueous solution in which an edible component is dissolved, or a fruit juice;
    the water absorption process proceeds for 10 minutes to 1 hour at room temperature and under atmospheric pressure, the room temperature being 20° C. to 25° C.; and
    the drying process is performed under the drying conditions of hot air temperature of 100° C. to 250° C. and exhaust air temperature of 70° C. to 150° C.

2. The method for producing a dried fruit powder according to claim 1, wherein the dried fruit obtained by drying a fruit including a peel and a seed is used as the dried fruit to be absorbed.

3. The method for producing a dried fruit powder according to claim 1, wherein in the pulverization step, a pulverization step by a coarse pulverizer and a subsequent fine pulverization step by a fine pulverizer are performed.

4. The method for producing a dried fruit powder according to claim 1, wherein the edible component in the aqueous solution is selected from a sugar and a starch hydrolysate.

5. The method for producing a dried fruit powder according to claim 4, wherein the starch hydrolysate is maltodextrin.

6. The method for producing a dried fruit powder according to claim 3, further comprising:
    in the pulverization step by the coarse pulverizer, pulverizing the dried fruit to a size of 1 mm to 5 mm.

7. The method for producing a dried fruit powder according to claim 6, further comprising:
    in the pulverization step by the fine pulverizer, pulverizing the dried fruit to the predetermined size of 1 mm or less.

8. The method for producing a dried fruit powder according to claim 1, further comprising:
    performing the drying process by spray drying.

9. The method for producing a dried fruit powder according to claim 8, wherein the spray drying is performed by a spray dryer, a disk type spray dryer, or a nozzle type spray dryer.

10. The method for producing a dried fruit powder according to claim 9, further comprising:
    performing the spray drying at an inlet temperature of 100° C. to 250° C. and at an outlet temperature of 70° C. to 90° C.

11. The method for producing a dried fruit powder according to claim 9, further comprising:
    adding water to the paste before performing the spray drying.

12. The method for producing a dried fruit powder according to claim 9, further comprising:
    adding an excipient to the paste during the spray drying.

13. The method for producing a dried fruit powder according to claim 12, wherein the excipient is maltodextrin.

14. The method for producing a dried fruit powder according to claim 1, wherein the dried fruit is one or more of dried raisins, dried mango, dried candied mango, and dried pineapple.

15. The method for producing a dried fruit powder according to claim 14, wherein the dried fruit is dried raisins having a moisture content of 16%, the method further comprises:
    adding the water to the dried raisins, the water having a temperature of 20° C.;
    adjusting a total solid concentration of the paste to 25% by adding maltodextrin and water to the paste; and performing the drying process by spray drying an inlet temperature of 130° C. and at an outlet temperature of 90° C.

16. The method for producing a dried fruit powder according to claim 1, wherein the dried fruit is dried mango having a moisture content of 15%, the method further comprises:
   adding the water to the dried mango, the water having a temperature of 30° C.;
   adding maltodextrin and water to the paste; and
   performing the drying process by spray drying an inlet temperature of 120° C. and at an outlet temperature of 90° C.

17. The method for producing a dried fruit powder according to claim 1, wherein the dried fruit is dried candied mango having a moisture content of 15% and a sugar ratio of 25%, the method further comprises:
   adding the water to the dried candied mango, the water having a temperature of 30° C.;
   adding maltodextrin and water to the paste; and
   performing the drying process by spray drying an inlet temperature of 130° C. and at an outlet temperature of 90° C.

18. The method for producing a dried fruit powder according to claim 1, wherein the dried fruit is dried pineapple having a moisture content of 12%, the method further comprises:
   adding the water to the dried pineapple, the water having a temperature of 40° C.;
   adding maltodextrin and water to the paste; and
   performing the drying process by spray drying an inlet temperature of 130° C. and at an outlet temperature of 90° C.

* * * * *